United States Patent Office 3,632,807
Patented Jan. 4, 1972

---

3,632,807
PROCESS FOR THE PREPARATION OF 2-CHLORO-PYRIDINE AND ITS DERIVATIVES
Manfred Maurer, Dirmstein, uber Frankenthal, Pfalz, Winfried Orth, Schifferstadt, and Ludwig Rappen, Duisburg-Meiderich, Germany, assignors to Rutgerswerke Aktiengesellschaft, Frankfurt am Main, Germany
No Drawing. Filed Nov. 8, 1968, Ser. No. 774,488
Claims priority, application Germany, Dec. 18, 1967,
P 16 95 659.5
Int. Cl. C07d 31/26
U.S. Cl. 260—290     5 Claims

ABSTRACT OF THE DISCLOSURE

Compounds corresponding to the formula

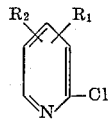

wherein $R_1$ as well as $R_2$ are selected from the group consisting of H, alkyl radicals having 1–4 carbon atoms and halogen, are prepared by reacting 2-amino-pyridines corresponding to the formula

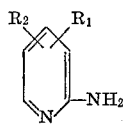

wherein $R_1$ and $R_2$ have the same meaning as above, in methanolic solution saturated with hydrogen chloride, with alkyl nitrite, in the temperature range of 0 to 50° C.

---

These compounds are intermediate products used in the preparation of diazotype dyes and hair dyes.

It has been known that in the case of aromatic compounds from amino-compounds halogen derivatives can be obtained by means of the Sandmeyer reaction. It has also been known that the decomposition of aromatic diazocompounds in alcohols results in alkoxy-derivatives and that thereby with increasing mol-weight of the alcohol and with increasing number of the alkyl groups in the aromatic compound the yield of ether strongly decreases. The type of substituents in the aromatic compound is thereby of importance for the yield of alkoxy-compounds insofar as alkyl groups have a strongly decreasing tendency and aryl groups have a weakly decreasing tendency and in the case of chlorine groups and nitrogroups, the results are strongly dependent on the alcohol. Thus, in the use of methanol ether and in the use of ethanol hydrocarbons are formed.

Moreover, it has also been known that 2-amino-pyridines—in contrast to aromatic substances—do not yield diazonium salt solutions capable of being isolated; they are, for example, only under particular conditions capable of coupling reactions. Diazotation in concentrated hydrochloric acid solution, yields 30–50% of chloroderivatives; besides, the hydroxyl-compound is formed (Houben-Weyl, 10/3, p. 54, 4th edition).

More favorable results are obtained only in the preparation of 2-chloro-4-n-propyl pyridine, i.e. the chlorocompound in a yield of 76%. (Solomon, J. Chem. Soc., 1946, 934.) However, this last mentioned process is troublesome and difficult under industrial conditions. It is thereby necessary to proceed at −17° C. and add pulverized solid sodium nitrite to an aqueous reaction solution which has been saturated at −17 C. with hydrogen chloride. In the diazotation of 2-amino-pyridines in concentrated hydrochloric acid, the yields of the desired chloro-derivatives cannot be improved even by the addition of copper powder or copper (I) chloride.

Another route of preparing 2-chloro-pyridine-derivatives consists in reacting the corresponding pyridine-N-oxides with sulfurylchloride in statu nascendi. However, the yields of this reaction are moderate (20–50%) and, moreover, a mixture of the 2- and 4-chlorocompound is formed (DBP 1,200,304).

Another possibility of obtaining 2-chloropyridines from 2-amino-pyridines, is based on diazotation in aqueous sulfuric acid and on the reaction of the thus obtained hydroxycompound with chlorinating agents, such as phosphorus trichloride, phosphorus pentachloride, phosphorus oxychloride, and thionylchloride in the presence of dimethylformamide as catalyst (DAS 1,178,052). The essential disadvantage of this process is the detour over the hydroxy compounds which—due to the sensitivity of the halogenating agents must be first isolated and dried.

Direct chlorination of pyridine is limited to the parent substance, because in alkyl-substituted pyridines the sides chains are also chlorinated.

The main object of the present invention is to provide a process which is industrially and economically advantageous, for preparing 2-chloropyridines from the corresponding 2-aminopyridines. This object is attained by preparing a compound corresponding to the general structural formula

wherein $R_1$ is selected from the group consisting of H, alkyl radicals containing 1–4 carbon atoms and halogen, and $R_2$ is selected from the group consisting of H, alkyl radicals containing 1–4 carbon atoms and halogen, by a process consisting essentially in reacting 2-amino-pyridines of the general structural formula

wherein $R_1$ is selected from the group consisting of H, alkyl radicals containing 1–4 carbon atoms, and halogen, and $R_2$ is selected from the group consisting of H, alkyl radicals of 1–4 carbon atoms, and halogen, by a process consisting essentially in reacting, in saturated methanolic solution of hydrochloric acid in the temperature range of 0 to 50° C. with alkyl nitrites. Particularly high yields are obtained by using at least 10 mols of methanol per mol of the amino-compound, saturating this mixture with dry hydrogen chloride gas and then reacting said solution with at least 2 mols of alkyl nitrite.

The compounds prepared according to the invention are intermediate products used in the preparation of diazotype dyes (British Pat. 870,027) and of modern hair dyes (DBP 1,142,045).

The following examples illustrate by way of example the process according to the invention.

GENERAL PROCEDURE 2 mols of the 2-amino-compound are added to 16–24 mol of methanol and the resulting solution is saturated with dry gaseous hydrogen chloride under stirring and cooling. Within 5 hours 2–6 mols alkyl nitrite are dropwise added under stirring and cooling so that a temperature range of 20–30° C. is maintained in the reaction mixture. After addition of the alkyl nitrite, the reaction mixture is allowed to stand for 12 hours and the alcohol which contains the excess HCl is completely distilled off.

The residue is taken up in 200–300 ml. of water and is rendered alkaline by the addition of concentrated aqueous ammonia under stirring, whereby a dark, heavy oil separates. Said oil is taken up in 200 ml. of chloroform or methylene chloride and the aqueous phase is extracted 3 times with 100 ml. of chloroform or methylene chloride each time. The extracts thus obtained are combined and dried with potash. The solvent is distilled off over a column and the residue is subjected to fractionation.

According to the above outlined procedure, the specific examples listed in the following table have been carried out.

tially in reacting 2-aminopyridines corresponding to the formula

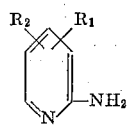

wherein $R_1$ is selected from the group consisting of H, alkyl radicals having 1–4 carbon atoms and halogen; $R_2$ is selected from the group consisting of H, alkyl radicals having 1–4 carbon atoms and halogen, in methanolic solu-

Examples

| Number | Starting compound | Mol ratio aminopyridine: methanol (HCl-saturated) | Mol ratio aminopyridine:nitrite | Products 2-chloro-compound | 2-alkoxy-compound | Starting compound |
|---|---|---|---|---|---|---|
| 1 | 2-amino-4-methyl pyridine | 1:8 | 1:1, butyl | 72.8%, B.P.$_{15}$: 84–85° C | 5.2%, B.P.$_{15}$: 63–64° C | 20.0% |
| 2 | do | 1:10 | do | 73.9%, B.P.$_{15}$: 84–85° C | 6.3%, B.P.$_{15}$: 63–64° C | 18.1% |
| 3 | do | 1:12 | do | 75.4%, B.P.$_{15}$: 84–85° C | 6.9%, B.P.$_{15}$: 63–64° C | 15.9% |
| 4 | do | 1:8 | 1:2, butyl | 84.8%, B.P.$_{15}$: 84–85° C | 6.0%, B.P.$_{15}$: 63–64° C | 6.8% |
| 5 | do | 1:10 | do | 85.5%, B.P.$_{15}$: 84–85° C | 7.9%, B.P.$_{15}$: 63–64° C | 5.1% |
| 6 | do | 1:12 | do | 85.9%, B.P.$_{15}$: 84–85° C | 8.4%, B.P.$_{15}$: 63–64° C | 4.1% |
| 7 | do | 1:12 | 1:3, butyl | 86.2%, B.P.$_{15}$: 84–85° C | 8.4%, B.P.$_{15}$: 63–64° C | 3.9% |
| 8 | 3-amino-3-methyl pyridine | 1:10 | 1:2, butyl | 84.2%, B.P.$_{15}$: 85–86° C | 7.7%, B.P.$_{15}$: 64–65° C | 6.1% |
| 9 | 2-amino-4,6-dimethyl pyridine | 1:10 | do | 86.4%, B.P.$_{15}$: 93–95° C | 7.0%, B.P.$_{15}$: 73–74° C | 5.2% |
| 10 | 2-amino-6-methyl pyridine | 1:10 | 1:2, amyl | 85.4%, B.P.$_{15}$: 82–83° C | 8.3%, B.P.$_{15}$: 60–62° C | 5.0% |
| 11 | 2-amino-4-n-propyl pyridine | 1:10 | 1:2, butyl | 87.2%, B.P.$_{15}$: 110–111° C | 5.5%, B.P.$_{15}$: 87–89° C | 5.2% |
| 12 | 2-aminopyridine | 1:10 | do | 85.8%, B.P.$_{15}$: 70–72° C | 7.0%, B.P.$_{15}$: 46–48° C | 5.9% |
| 13 | 2-amino-4-methylpyridine | 1:10 | 1:2, propyl | 85.2%, B.P.$_{15}$: 84–85° C | 7.6%, B.P.$_{15}$: 63–64° C | 5.0% |
| 14 | 2-amino-5-chloropyridine | 1:10 | 1:2, butyl | 86.1%, B.P.$_{760}$: 191–192° C., Fp.: 59–60° C. | 6.8%, B.P.$_{760}$: 178–180° C | 5.5% |
| 15 | 2-amino-3,5-dichloropyridine | 1:10 | do | 82.3%, B.P.$_{760}$: 218–219° C., Fp.: 49–50° C. | 7.8%, B.P.$_{760}$: 193–195° C | 8.5% |

The abbreviation "DBP" stands for "Deutsches Bundespatent" and the abbreviation "DAS" stands for "Deutsche Auslegeschrift."

The yields are given in percents of theory.

What is claimed is:

1. A process for the preparation of 2-chloropyridine and its derivatives corresponding to the formula

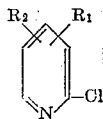

wherein $R_1$ is selected from the group consisting of H, alkyl radicals having 1–4 carbon atoms and halogen; $R_2$ is selected from the group consisting of H, alkyl radicals having 1–4 carbon atoms and halogen; consisting essentially in reacting 2-aminopyridines corresponding to the formula [...] tion saturated with gaseous hydrogen chloride in the temperature range of 0 to 50° C. and adding to said solution an alkyl nitrite selected from the group consisting of propyl nitrite, butyl nitrite and amyl nitrite.

2. A process as claimed in claim 1, in which a molratio aminopyridine:methanol of 1:8 to 1:12 is used.

3. A process as claimed in claim 1, in which a mol-ratio aminopyridine:alkyl nitrite of 1:1 to 1:3 is used.

4. A process as claimed in claim 1, in which the reaction of 2-aminopyridine with alkyl nitrite is carried out in the range of 20 to 30° C.

5. A process as claimed in claim 1, in which 2-amino-4-methylpyridine is reacted.

References Cited

UNITED STATES PATENTS 3,251,848  5/1966  Taplin _____ 260—290

HENRY R. JILES, Primary Examiner

H. I. MOATZ, Assistant Examiner